United States Patent
Breiter et al.

(10) Patent No.: US 6,934,723 B2
(45) Date of Patent: Aug. 23, 2005

(54) METHOD FOR FILE SYSTEM REPLICATION WITH BROADCASTING AND XDSM

(75) Inventors: Gerd Breiter, Wildberg (DE); Thomas Raith, Ditzingen (DE)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 09/740,766

(22) Filed: Dec. 19, 2000

(65) Prior Publication Data

US 2001/0007103 A1 Jul. 5, 2001

(30) Foreign Application Priority Data

Dec. 23, 1999 (EP) ............................................ 99125773

(51) Int. Cl.⁷ ............................................. G06F 17/30
(52) U.S. Cl. ........................ 707/204; 707/202; 707/203
(58) Field of Search ................................ 707/200–205, 707/1–10, 100, 104.1; 709/214, 204, 232, 238, 234, 230; 370/475, 392, 310, 471; 711/118; 375/377

(56) References Cited

U.S. PATENT DOCUMENTS 5,812,773 A * 9/1998 Norin .......................... 709/204
5,926,816 A * 7/1999 Bauer et al. ..................... 707/8
6,023,710 A * 2/2000 Steiner et al. ............... 707/204
6,286,031 B1 * 9/2001 Waese et al. ................ 709/203
6,298,386 B1 * 10/2001 Vahalia et al. .............. 709/203
6,381,215 B1 * 4/2002 Hamilton et al. ........... 370/236
6,594,702 B1 * 7/2003 Fischer et al. .............. 709/232

OTHER PUBLICATIONS

© The Open Group. PTR Edition C429P Systems Management: Data Storage Management (XDSM) API 3/1997I.*

* cited by examiner

Primary Examiner—Charles Rones
Assistant Examiner—Neveen Abel-Jalil
(74) Attorney, Agent, or Firm—William A. Kinnaman, Jr., Esq.; Kevin P. Radigan, Esq.; Heslin Rothenberg Farley & Mesiti P.C.

(57) ABSTRACT

A method and system are provided for replicating data in a network to a plurality of client applications which are associated to at least one server. Network traffic is reduced and an easy-to-do automated data replication is achieved basically by monitoring and storing modification information on server data exploiting XDSM capabilities in order to generate replication data for a subsequent distribution to the clients and by broadcasting said replication data from said server system to said client systems. Further, the replication data can advantageously be streamed to the clients through the network.

20 Claims, 5 Drawing Sheets

METHOD FOR FILE SYSTEM REPLICATION WITH BROADCASTING AND XDSM

PRIOR FOREIGN APPLICATION

This application claims priority from European patent application number 99125773.4, filed Dec. 23, 1999, which is hereby incorporated herein by reference in its entirety.

1. Technical Field

The present invention relates to a method and system for replicating data in a computer network. In particular, the present invention relates to a method and system for replicating data in a network in which a plurality of client applications are associated to at least one server application.

2. Background Art

Basically, the subject matter of the present invention is applicable to network traffic in a broad variety of applications, i.e. whenever an application has a distributed nature or if the same or a similar message is able to be addressed to a plurality of clients placed in the network. Network computing is an important sector of information technology. Modern business uses distributed applications for operating distributed file systems spread across large regions supported by a network of computer systems spanning that region and used by a plurality of persons for a plurality of different purposes.

The increasing acceptance of the Internet during the last years increased the network traffic even more.

In such networking environments there is often the need to replicate data, i.e., complete data bases as well as other arbitrary sets of data for a plurality of purposes to various locations within the network.

In the case of distributed file systems, data are replicated all across the network onto a plurality of participating subsystems almost due to performance requirements as a faster access to data can be provided when said data is replicated in a location where it is used frequently. Data are replicated further as they can be comfortably processed on the decentralized locations as sufficient computing resources are present in a majority of subsystems maintaining the decentralized copies of the unique data. Such data replication mechanisms are found spread across LANs (local area networks), WANs (wide area networks), and the world wide web including finally even everybody's home computer into such network.

But even in TV devices, home computers, office computers, notebooks, handys, mini computer devices, etc. there is a piece of software setting up the user-directed part of a plurality of applications. Such software, however, has to be updated from time to time as well, and is thus subject of a data replication procedure as well, as every new version of any program has to be installed in such user terminals.

In distributed file based applications the obligation to replicate data results in the problem to keep the decentralized replicas consistent with the master copy throughout the entire network. One possible approach to solve this consistency issue is to grant a read only access onto the replicated data only, to concentrate all possible data changes only on the centralized master data and to update at a certain point in time all replicas within the network based on the centralized master data in order to preserve data consistency.

The last step of updating the replicas placed across the network is, however, a problem because each of the replicas is updated separately in today's systems. It is assumed that the master data has a size of S bytes and a number N of terminals each hosting a decentralized set of files being subject to the updating procedure. To update one single replica in the network a copy operation has to be executed which transfers these S bytes from the central system. In order to update all N replicas in the network a total of N×S bytes would have to be transferred through the network. This is referred to herein after as 'point-to-point' data replication. Depending on the number N of replicas and the data size S this replication operation puts some heavy load on the network.

A first problem is thus to keep track of all file changes occurring in such central data server.

A second problem is to perform data replication with a decreased network traffic compared to prior art 'point-to-point' data replication.

SUMMARY OF THE INVENTION

It is thus an object of the present invention to provide a method and system for replicating data in a network comprising at least one data server computer system and a plurality of client computer systems connectable to said network, in which it is possible to reliably keep track of all file changes occurring in said central data server and then to perform the data replication onto the plurality of client systems with a significantly decreased amount of network traffic.

It is a further object of the present invention to provide such method and system which is adapted and dedicated to file systems managed by data servers according to the XDSM X-open standard, or comparable methodologies implemented for instance based on stackable file systems.

These objects of the invention are achieved by the features stated in enclosed independent claims. Further advantageous arrangements and embodiments of the invention are set forth in the respective subclaims. Network traffic is reduced and an easy-to-do automated data replication is achieved basically by monitoring and storing modification information on server data exploiting XDSM capabilities in order to generate replication data for a subsequent distribution to the clients and by broadcasting said replication data from said server system to said client systems.

According to a first aspect of the present invention this is achieved basically by monitoring and storing modification information on server data in order to generate replication data for a subsequent distribution to the clients and by broadcasting said replication data from said server system to said client systems.

Further, the replication data can advantageously be streamed to the clients through the network.

Further, and with special reference to distributed file based application systems file changes occurring in the data server's file system are monitored and after a replication stream has been broadcasted through the network the success of a replication on the plurality of client systems is monitored based on some acknowledgments which are directed back to the server and issued by a client system when a data replication has completed successfully.

According to a further, preferred aspect of the present invention, the task of monitoring said file changes comprises the step of communicating with the file system of the server via program facilities which are comprised of the XDSM-standard. XDSM comprises a set of application programming interfaces, API, and so-called Callback-functions which monitor each change in files of the server's file system. An inventional replication control process monitors the file system of the server by a communication with said APIs and Callback functions.

When said replication control process is initialized, i.e. after system start or after further events which are basically freely definable by a system operator:

1. which subset of the file system should be replicated,
2. the addresses of all client computer systems which are included in the replication process,
3. the type of replication, i.e. a δ-replication or a full-replication,
4. the interval-cycle in which a new replication data stream is generated,
5. the minimum-duration during which a replication data stream is broadcasted, or a certain minimum number of repetitions of broadcasting a data stream,
6. a fraction, e.g. in percent, of the number of clients which have successfully received the replication data stream after said replication stream has been broadcasted.

The replication control process registers with the data server's file system with the help of the XDSM-interfaces in order to be informed about any changes of the file system caused by the usual write, erase or edit processes.

After initialization or after a change of important system parameters as e.g. a redefinition of the fraction of the file system to be replicated, respectively the replication control process broadcasts a replication stream into the network which comprises a full replication of the data asset fractions to be replicated.

Then, the type of replication method can be selected to be either a δ-replication or a so-called full-replication.

In case of a δ-replication each change in the relevant parts of the data asset to be replicated which happened after the before mentioned initial broadcasting is tracked by the replication control process. Then, a new broadcast stream is set up comprising the changed data, either when a predetermined time limit has elapsed, or triggered by interaction of a system administrator at the data server's site, and is broadcasted into the network as described above. Broadcasting is then cyclically repeated until either the minimum time has elapsed, or the minimum number of cyclic replication has been broadcasted, or the predetermined fraction of client systems intended to receive the replication data stream has been reached.

In case of the full-replication method each time when the predetermined interval cycle has elapsed and some file changes have occurred, a new replication data stream is formed comprising the total of the data asset to be replicated and is broadcasted through the network. In this case the former replication data stream which stems from a former replication cycle is not repeated.

According to a preferred aspect of the present invention a client system which has successfully received a replication data stream, either delta or full-replication, acknowledges the successful receipt via a separate logical connection to the replication control process located at the data server. All acknowledgments are then gathered and some type of statistical computations can be started in order to decide how long a particular broadcast stream has to be repeated. Such type of prevision is advantageously updated with the incoming new acknowledgments.

According to a further additional aspect of the present invention a client system which is switched online infrequently only and can thus be reached by any replication data broadcast stream not easily can use said connection between client system and data server in order to request a single full replication which can then performed by any prior art point to point data transfer.

The inventional data replication method has the particular advantage to be very flexible in the sense that it can easily be taken a decision if a delta-replication or a full-replication is desired. Thus, individual requirements set up by any particular business environment can be easily met. For example, when there is a high rate of changes occurring in short intervals of time in the central data server file system a full replication may be advantageous compared to a δ-replication. On the other hand, when the number of changes is small a δ-replication may be preferred.

The inventional data replication method can be applied in any network using some transfer protocols which support a combination of broadcasting and streaming. The inventional method and system can advantageously be used for distributed CAD/CAM applications, or for distributed web-server systems which are intended to provide basically always the same data but which have been decentralized because of a better performance or any reasons implied by the underlying network topology.

It should be noted that the inventional method and system can be advantageously used for any mobile clients which are usually switched online only very rarely and thus are rarely connected to the data server's file system and thus have to replicate the data locally.

The inventional data replication method can be used universally. No specific file system like DFS (Distributed File System) or NFS (Network Filesystem), for example is necessary.

Further, the network traffic involved in data replication is reduced drastically.

Further, the task of continuously updating a software system can be advantageously automated by the inventional replication method. No distribution lists and prior art update procedures are necessary as an update procedure can be performed optionally by inserting the updated files into the client systems file system and thus activating a new version automatically without interaction of the end-user associated with a particular client system. In this case an operator has only to install a respective software tool implementing the inventional method and the rest is done automatically, i.e. the data replication is performed when any of the plurality of client systems goes online and is thus enabled to receive the data replication broadcast stream.

In this respect some automated transparent client file update is achieved directly after a log-on into the network. An explicitly user-selected and user-triggered data replication process is thus only optional.

Depending on the business environment it is proposed to fix some predetermined points in time to which a broadcast stream issued by the data server is broadcasted into the network. Thus, if said points in time are made known to the plurality of clients a timer provided in the client system can be automatically controlled to start the client system, to go online and to receive the broadcast stream. Alternatively, systems can be started by the end-user, too. This increases the number of successful automated data replications to the client systems.

BRIEF DESCRIPTION OF THE DRAWINGS

The present invention is illustrated by way of example and is not limited by the shape of the figures of the accompanying drawings in which.

BEST MODE FOR CARRYING OUT THE INVENTION

Figure 1:
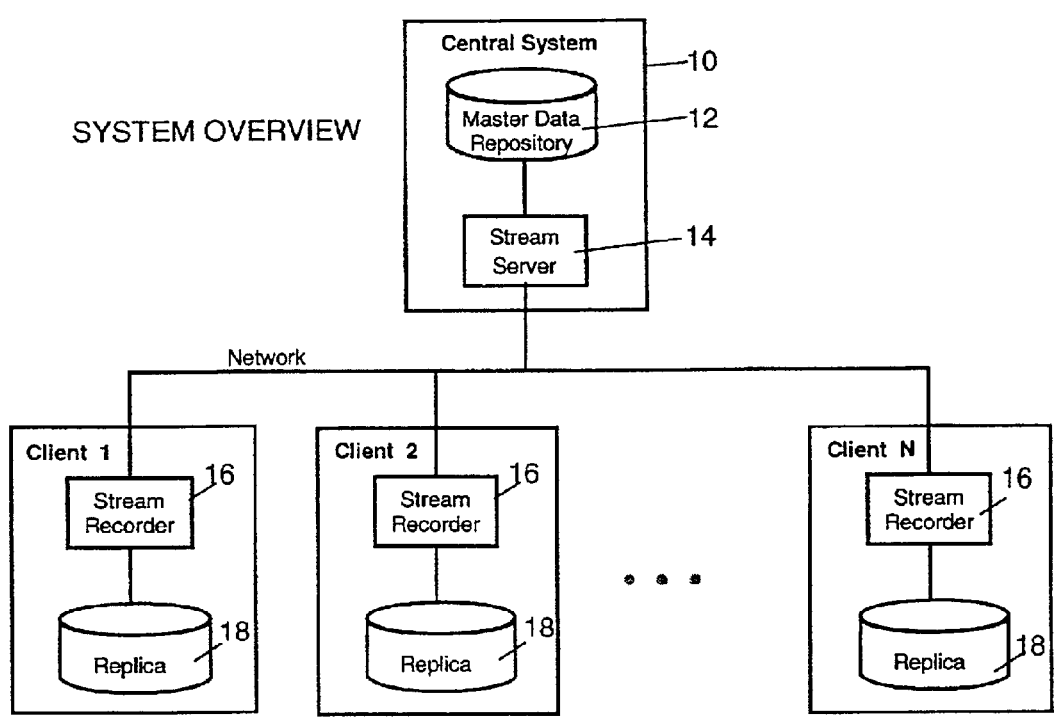
FIG. 1 is a schematic diagram illustrating the basic hardware components and the basic structure of network topology used during the inventional method.

With general reference to the figures and with special reference now to FIG. 1, the hardware components used during the inventional method are described in more detail below.

A central data server system 10 is depicted to comprise a master data repository 12 and a stream server 14. Said server is connected to a number of N client systems via an appropriate network. The client systems are addressed by their TCP/IP addresses. No particular type of network is required for the purposes of the present invention. Even wireless communication can be used. Each of the client systems 1 . . . N has a stream recorder 16 and some storage 18 for storing the replication data denoted as 'Replica'. According to a preferred aspect of the present invention in which the N client systems send back some control information to the Central system—which is described below in more detail—a bidirectional connection should be possible to be enabled between the server system 10 and each client system, respectively. An inter-client connection is not required.

Figure 2:
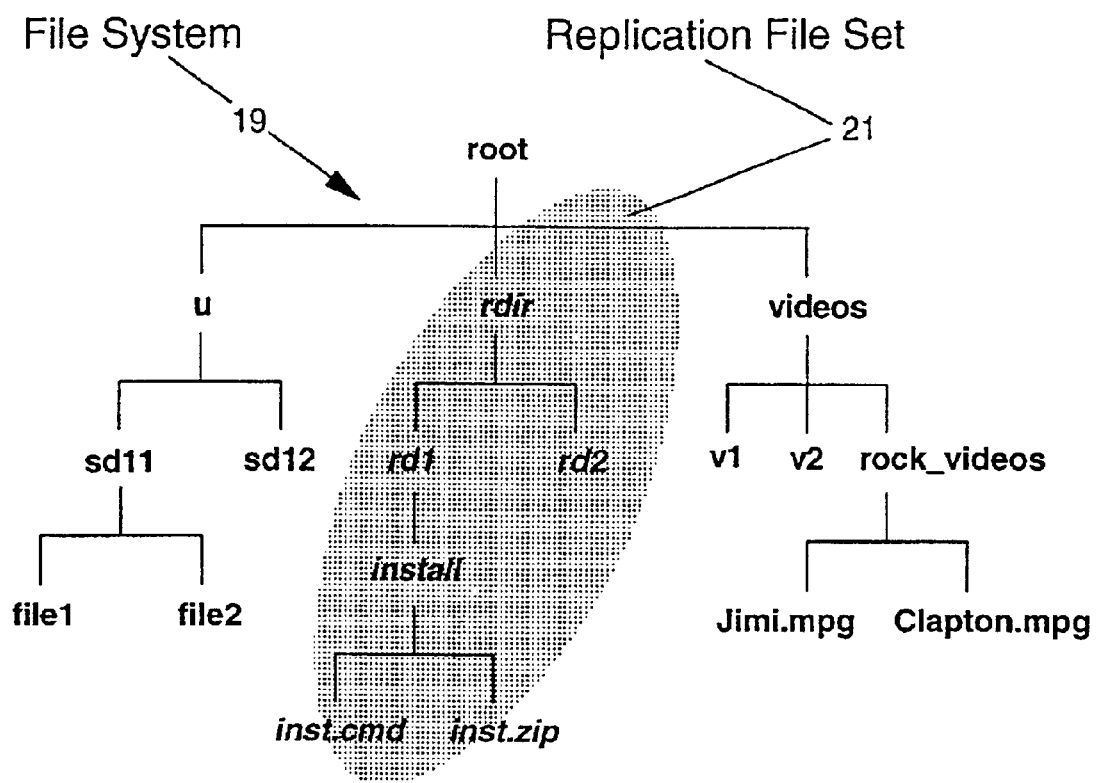
FIG. 2 is a schematic representation of the data server file system showing the definition of replication data.

With reference now to FIG. 2, the server's file system 19 is depicted as far as it is subjected to the inventional replication control. A subset 21 of the server file system 19 is denoted as 'rdir' with associated subdirectories as it reveals from the drawing. Said subset 21 is defined as the set of files being monitored by the before-mentioned set of APIs and so-called Callback-functions comprised of the XDSM-standard which run permanently on the data server 10 and which keep track of any file changes occurring during any write access in said file system. This prior art feature can advantageously be exploited for the purposes of the present invention.

An inventional replication control process implemented in the server system and which forms a significant part of the inventional method and system receives the information about the changed files 20 of the selected subset 21 of the data server's file system. Said subset of changed files 20 is thus regarded exemplarily as a 'replica'. Although files in other subdirectories like 'videos' or 'u' are not monitored, and therefore not comprised of the replication file set, the inventional method is not limited to just one single set of files in subdirectories of the file system 19, as other subsets of file system similar to said replication file set 21 can be monitored too.

Figure 3:
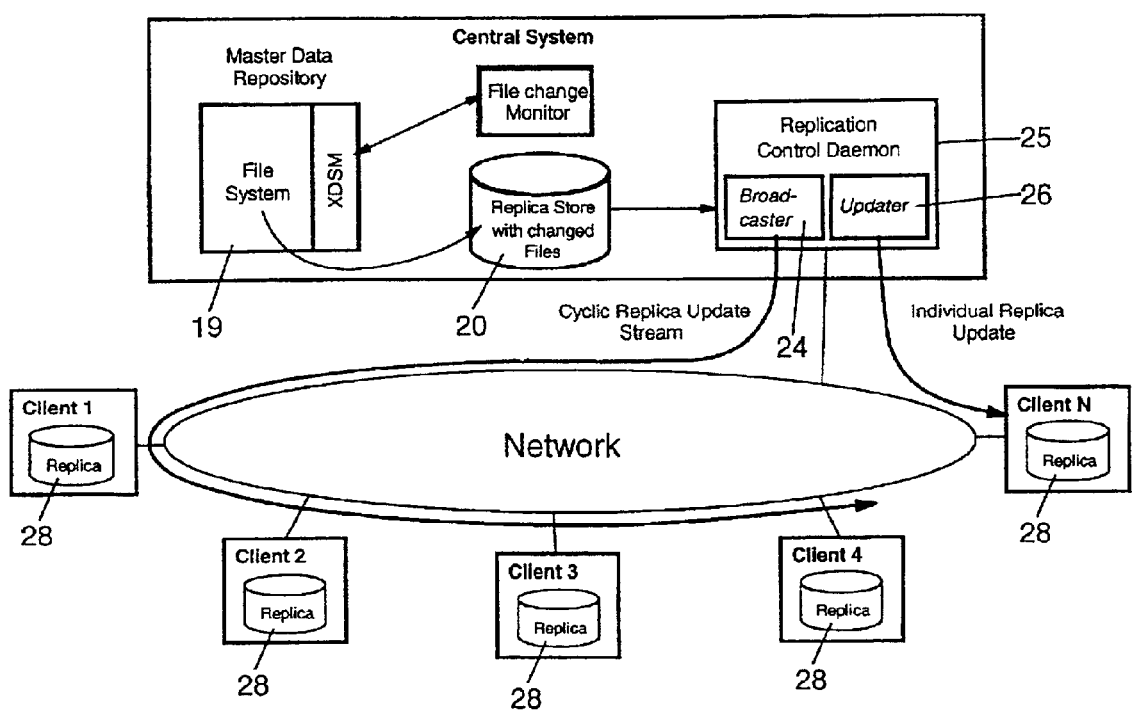
FIG. 3 is a schematic representation of the basic software and hardware components involved in the inventional replication process with regard to the distribution control of the replicated data.

With reference now to FIG. 3 which shows the most essential software and hardware components involved in the inventional replication distribution and control process the replication control process which is implemented in the present example as a daemon process 25 is told the TCP/IP addresses of all clients 1–N to be intended to receive the broadcast stream.

As soon as the replica 20 is ready for distribution it is made available to the replication control daemon 25 which broadcasts it into the network by means of a broadcaster process 24. Broadcasting is symbolically depicted in the bottom portion of FIG. 3 as a circulating data stream.

Depending on the actual situation some of the clients depicted are online, some are off-line and thus, only some fraction of them will be able to receive the data replication stream. In order to give the client systems an increased chance of receiving the replication stream it is proposed to repeat the broadcasting procedure until some predetermined fraction of client systems has successfully received it. Then, the broadcasting is terminated. The remaining portion of clients which have not yet received successfully any broadcast stream are proposed to be updated individually according to prior art. This is depicted in the right portion of FIG. 3 with respect to client N. For the purpose of the individual update some program means 26 is provided in the replication control daemon. This means is denoted as 'updater' 26.

Figure 4:
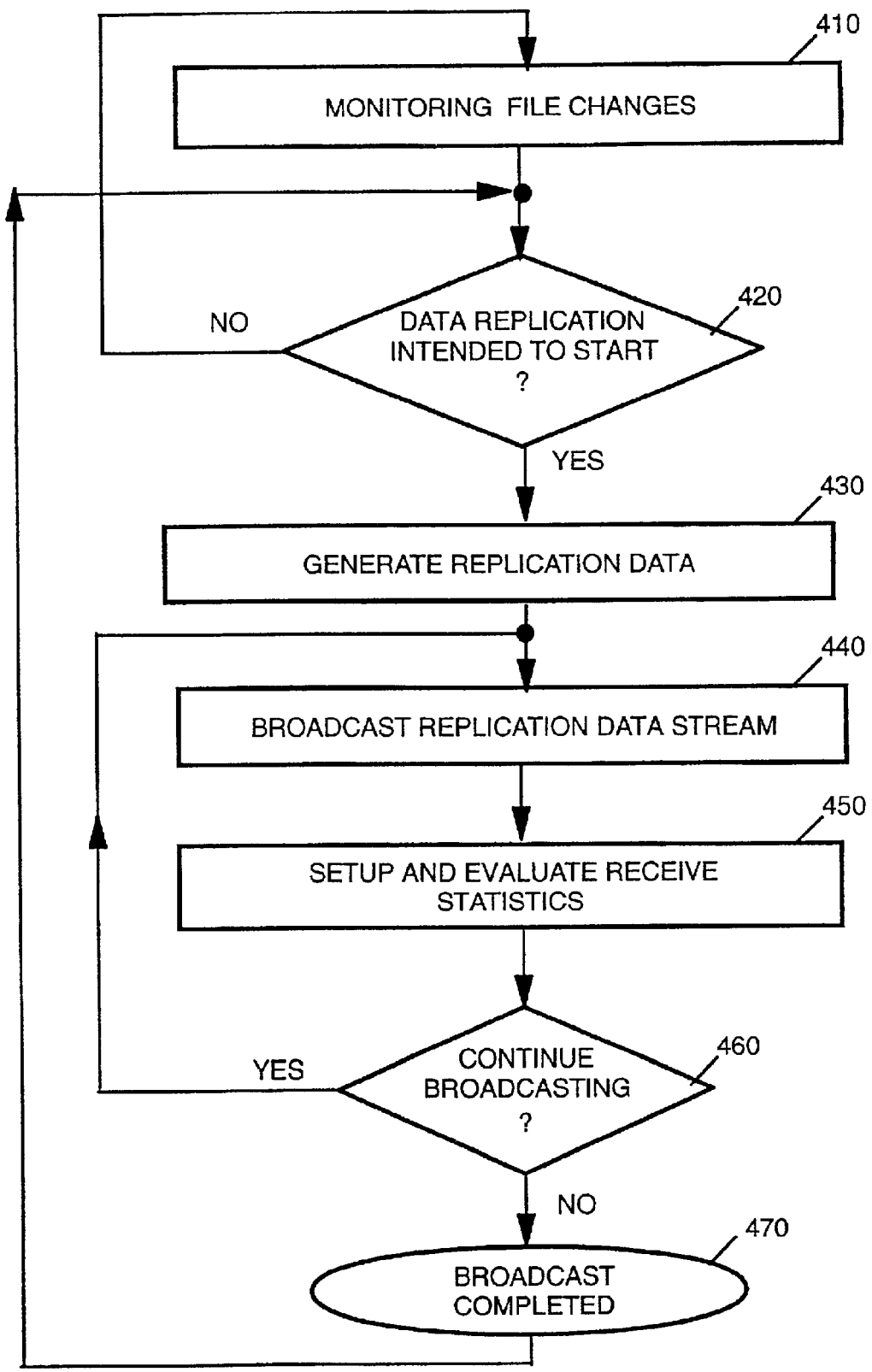
FIG. 4 is a schematic block diagram showing steps involved in the inventional method which are processed at the data server's site.

With reference now to FIG. 4 the basic steps triggered by programming means provided in the central data server 10 are described in more detail further below. Where appropriate, additional reference will be made to FIG. 5 which illustrates more clearly the concurrent presence of several processes which contribute to the inventional method and which are running on different hardware systems, e.g. on the data server 10 and on the plurality of clients depicted in FIG. 3 and cooperating with program means located in the server 10.

Figure 5:
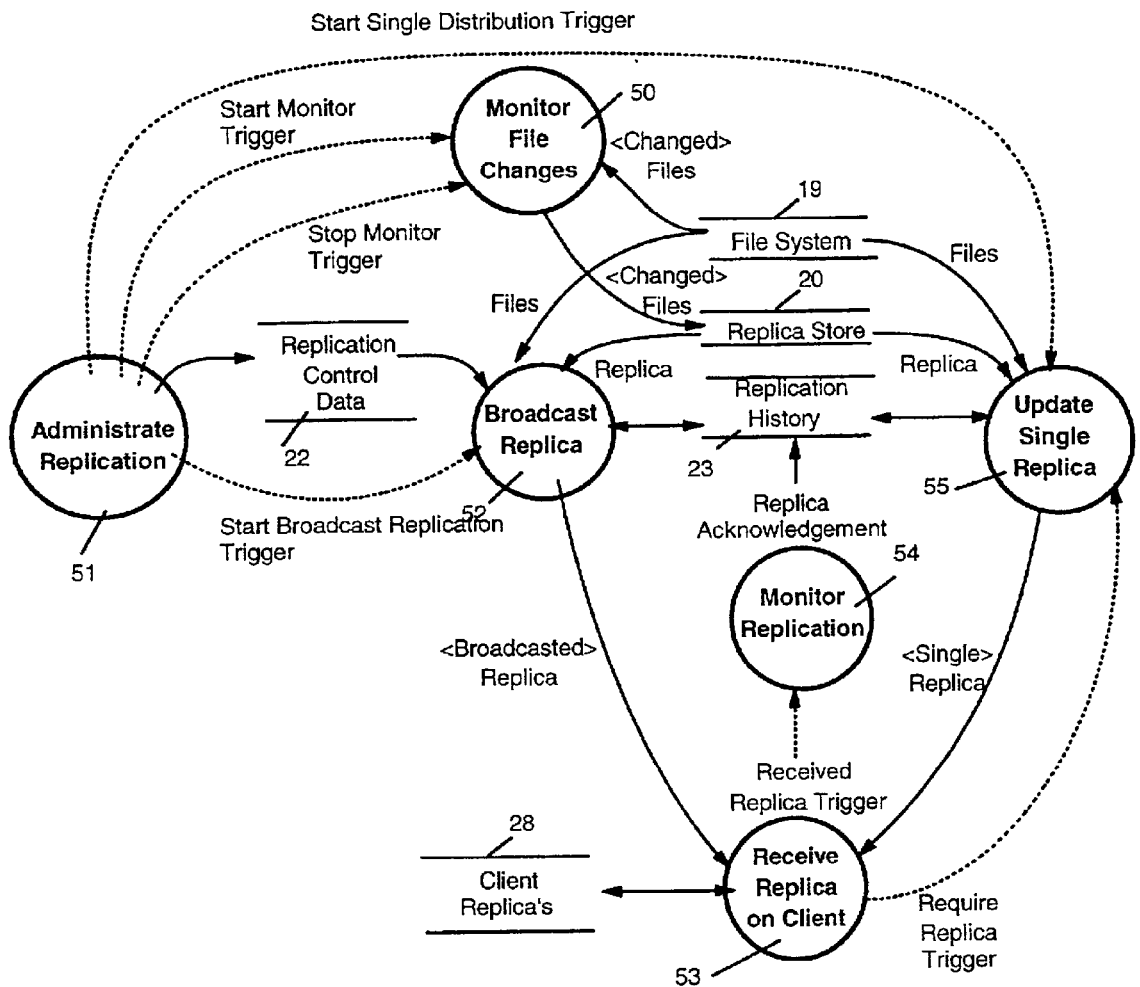
FIG. 5 is a schematic representation showing a processes overview during data replication distribution and control.

In a first step 410 all file changes are monitored which occur in the data server's file system. In FIG. 5 there is a corresponding item, namely the circle 50 which is intended to illustrate the corresponding monitoring process, e.g. in the unix domain the before-mentioned daemon.

In FIG. 5, generally, such processes are depicted as circles. Such processes have one or more inputs and one or more outputs which are depicted as arrows with a respective indication of direction. Additionally, essential physical or logical devices, which for example store some data which is relevant for the present inventional data replication method is written between two horizontal lines, respectively.

Said process 50 monitors file changes in the file system, based on said XDSM APIs which can be used for callbacks to intercept file modification commands in order to determine changes that occur within a specified 'Replication File Set' 21 depicted in FIG. 2.

'Changed Files' as depicted in FIG. 5 can be detected by monitoring whether a file that has been opened for a write operation is being closed again. Other control mechanisms are of course possible as well, as e.g. using prior art checksums, if appropriate.

Monitoring starts when the process receives a 'Start_Monitor_Trigger', issued by a further process 51 described later, or triggered manually by a system operator. Said start-trigger specifies the 'Replica_Id', i.e. a unique identification of the intended Replica, and the 'Replication_File_Set', mentioned above. The process creates a new 'Replica' entry with a 'Replica_Id' as a key for retrieving it in the 'Replica Store' 20, sets the '<start> Timestamp', and continues adding '<changed> Files' from the 'File System' 19 to the 'Replica'. This ends once a 'Stop_Monitor_Trigger' is received with the completion of the 'Replica' with the subject 'Replica_Id', and an appropriate '<end> Timestamp' is added, too. The subject 'Replica' comprising at least the changed files advantageously including the corresponding source directory information is then ready for distribution. Advantageously, the 'Replica' stores enough information in order to re-establish a complete data replication on the client systems without a user interaction being required there.

In a next step, 420, depicted in FIG. 4 it is decided if a data replication is intended to be started or not.

This is done amongst other things by a process 51 which is called 'Administrate Replication'.

This process can be initiated by a human being—said administrator mentioned above—who initiates various further operations associated with file replication. The most important of them are as follows:

1. In order to initiate file monitoring for a subset of data files that have to be controlled for changes for a subsequent distribution, this process initiates said 'Start_Monitor_Trigger'. The parameters to specify are 'Replica_Id' and 'Relication_File_Set' as mentioned above.
2. In order to complete file monitoring for a subset of data files the process sends a 'Stop_Monitor_Trigger'. The parameter to specify is 'Replica_Id'. Thus, a particular file system monitoring task has a well-defined start time and completion time. Advantageously, the stop-trigger can be combined with the start-trigger for the subsequent monitoring task if a monitoring is desired which is intended to be continous in time.

3. In order to start distribution of the completed 'Replica', the process issues one of two possible triggers a, or b: a. The 'Start_Broadcast_Replication_Trigger' to process 'Broadcast_Replica' 52. This initiates replication by broadcast streaming to a plurality of client systems, using parameters which are specified in a file 22 'Replication_Control_Data'. The parameters to specify are 'Replica_Id' and 'Replication_Method' which can have at least the values 'full' or 'delta' and which is described below. b. The 'Start_Single_Distribution_Trigger' to process 'Update_Single_Replica' 55. This initiates an individual transfer of a '<single> Replica' to a specific client system. The parameters to specify are 'Replica_Id' and 'Replication_Method', together with the 'Client_id' of the target system. By this process a client system can be advantageously updated which was not reached during a preceding broadcasting process.

4. To control data distribution using broadcast streaming appropriate 'Replication_Control_Data' will be specified by this process.

With reference back to FIG. 4 in case no replication is intended to be performed yet, it is branched via the NO-branch in step 420 back to step 410 where the control is continued with monitoring the file changes in the data server. In the YES-branch of step 420, however, the control flow is continued to show how the replication is actually proposed to be performed.

At some predetermined point in time, or, when the system administrator thinks it is useful, it is decided to finish gathering the file changes and to generate the replication data, i.e. which can be considered as some well-defined plurality of files which in turn comprise the actually changed data. This amount of data which is mentioned above as replica is depicted with reference sign 20 in FIG. 3. It should be noted, that before generating said replication data the inventional method is open for an individual decision which replication method to choose, i.e. if to choose a full replication method or a delta-replication method.

Then, in a step 440 the replication data stream is broadcasted through the network. This process is depicted with reference sign 52 in FIG. 5.

This process is responsible for data replication for said plurality of clients. It is triggered by said 'Start_Broadcast_Replication_Trigger' mentioned above. Based on the 'Replication_Method' specified it will either distribute a completed 'Replica', or perform a complete replication of all the data in the 'Replication_File_Set'. The distribution is advantageously performed for a plurality of clients which are online concurrently, using Broadcast Streaming. This is controlled by parameters specified in said 'Replication_Control_Data' 22 according to the respective method specified.

Replication_Data is either a given Replica, or all the files in the original Replication_File_Set.

Basically, the Replication_Data are repeatedly streamed until a specified number of 'Replication_Cycles', e.g., 10 is reached, and/or a specified 'Replication_Duration' as e.g., 5 minutes is exceeded, and/or an appropriate fraction or amount of clients as specified in 'Replication_Fulfillness' have successfully received the Replication Data, as e.g., 80%, and/or 1600 of a total of 2000 clients.

In order to facilitate monitoring the data distribution, a composite record 'Replication_Acknowledgment' is created, which has a list of 'Client_Id's with associated 'Client_Acknowledgment's to indicate the distribution status for each client. Additionally, '<achieved> Replication_Fulfillment' (versus '<required> Replication_Fulfillment') is the status information used to control whether replication could be stopped. These records are stored in 'Replication_History' 23, which is updated by the 'Monitor_Replication' process. Said Replication_History is a file advantageously located and accessed by the central server 10.

With reference back to FIG. 4, said before-mentioned step is depicted with reference sign 450. Thus, said statistics about the rate of successfully performed data replications on the client systems is set up preferably in the data server and is evaluated in order to decide in a decision 460 if the intended minimum number of client systems have already received a data replication successfully, or not. In order to achieve this, preferably in the data server some array is provided which provides an entry for each client system. In here, the appropriate information is stored in order to make the before-mentioned decision feasible. For said purpose, at least a flag which indicates successful or unsuccessful data replication is maintained per entry.

In FIG. 5 the process 53, called 'Receive Replica on Client' is described next.

This process is executed on each client system which is registered to receive 'Replica'. The 'Client_Id' of a registered client is known to the Administrator, or, an automated process 'Administrate_Replication', and the associated 'Client_Id' is stored as a part of 'Replication_Control_Data'. When a client system goes online, then it checks its local 'Client_Replica's' store 28 to determine the 'Replica_Id' of the latest update it has got.

Based on this it then issues a 'Require_Replica_Trigger' to the 'Update_Single_Replica' process 55. As a result of this it might get a newer 'Replica'—if a newer one exists which already has been transmitted to other client systems during off-line time of this client. The process stores the newer 'Replica' together with the associated 'Replica Id' in its local 'Client_Replica's' store 28 as the latest version. At any point in time the process 53 may receive an unsolicited '<Broadcast> Replica', which it will receive and store locally, too. Whenever the client system has received a complete 'Replica', it issues a 'Received_Replica Trigger' with its 'Client_Id' and the received 'Replica_Id' to signal a successful receipt of the transmission.

The statistics mentioned above can be calculated by virtue of a further process 54, called 'Monitor Replication' which receives some replica trigger on a successful data replication on the client and which generates a corresponding replica acknowledgment which is provided for reading by the data server 10.

This process is responsible to receive client acknowledgments, and to update the 'Replication_History' appropriately. It is triggered by 'Received_Replica_Trigger's. As a result of such an event the 'Replication_Acknowledgment' will be updated appropriately. Therefore the 'Client Acknowledgment' for this 'Client Id' will be set to 'ack', and the '<achieved> Replication_Fulfillment' number will be recalculated.

As described above, or, alternatively, after having gathered during a particular, predetermined maximum time span it is decided in the data server if broadcasting should be continued or not, step 460. In case for example when the required minimum number of successful data replications has not yet been reached, control is fed back to step 440 in FIG. 4. Otherwise the particular broadcast procedure is completed and the control is fed back to step 420 in order to be ready to prepare the next broadcast stream.

Additionally and optionally—the client systems which have not been reached for performing a data replication on them can be individually accessed by usual prior art file transfer processes. This is a prior art point-to-point connection which can be switched active whenever one of these remaining clients goes online.

This process is responsible for 'Replica' update of a single client system. It is triggered by a 'Require_Replica_Trigger', which is issued by the client itself when it comes online. Part of the trigger is the client's unique identification ('Client_Id'), together with the latest 'Replica_Id' which the client received earlier. Based on the 'Replication_History' it is decided which 'Replica' the client should receive, or whether to perform a full update of all the data in the 'Replication_File_Set'. The data transfer is performed using point-to-point file transfer.

For providing a perfect understanding of the control flow and the data involved as depicted in FIGS. 4, and 5, respectively, the following explanations are given supplementally as a kind of supplemental data dictionary. For said dictionary the following legend applies:

::- is defined as
{. .} set of 0 to arbitrarily many of . .
[. .] 0 or 1 of . .
// indicates all the line as a comment
+ composition
< > attribute, which is basically a comment
| alternative Data Dictionary:
Start_Monitor_Trigger ::-

// This trigger initiates monitoring of file changes in
// the file system, which occur relating to a specified
// 'Replication_File_Set'. All these changes will be
// collected as a 'Replica' using the associated 'Replica_Id'
// which has to be specified by an Administrator.
    Replica_Id
+ Replication_File_Set.

Stop_Monitor_Trigger ::-

// This trigger stops monitoring of file changes in the
// file system, which completes a 'Replica' before it can
// be distributed.
    Replica_Id.

File System (store) ::-

// An entire file system. Parts of it will be monitored
// to determine file changes (see 'Replication_File_Set').
// It consists of a set of files.

Files ::-

// A set of 'File's.
    {File}.

File ::-

// The smallest unit of information in a file system,
// for which changes can be monitored.

Replica_Store (store) ::-

// The collection of all single 'Replica's.
    {Replica}.

Replica ::-

// The data that has been collected for distribution. This
// comprises all the changes that occurred in the
// 'Replication_File_Set' between the starting time
// '<start> Timestamp' and the ending time '<end> Timestamp'.
// The 'Replica_Id' which is specified by an Administrator
// is a unique key for a certain 'Replica'.
    Replica_Id
+ Replication_File_Set
+<start> Timestamp
+<end> Timestamp.
+{<changed> Files}.

Replica_Id ::-

// A character 'String' which uniquely identifies a
// replication file set.
    String.

Replication_File_Set ::-

// A character 'String' consisting of a single path name in
// a file system, or a set of path names. It specifies which
// subdirectories in a file system have to be monitored to
// determine file changes which have to be put into a
// 'Replica' for later distribution to the clients.
    {String}
+{',' String}.

Timestamp ::-

// A unique time marker. Often represented as a 'String'.
    String.

String ::-

// A set of characters.

Distribution_Control_Data::-

// Specifies key parameters for distribution of 'Replica's
// using broadcast streaming. Especially there is the list
// of all client system Id's.
    {Client_Id}
+ Replication_Cycles
+ Replication_Duration
+ Replication_Fulfillness.

Replication_Method ::-

// Indicator for delta-replication or full replication.
    'full'
| 'delta'.

Replication_Cycles ::-

// Number of cyclic repetitions of a replication stream.
    Number.

Replication_Duration ::-

// Duration of cyclic repetition of a replication stream.

Number.

Replication_Fulfillment ::-

// A percentage that specifies the amount of clients that
// should have successfully received an update before cyclic
// repetition of a replication stream will be stopped.
    Number.

Start_Broadcast_Replication_Trigger ::-

// A trigger which indicates that replication has to start for
// a 'Replica' which is specified by means of 'Replica Id'.
// Broadcast replication can distribute an entire
// 'Replication_File_Set' if the 'Replication_Method' is
// 'full', or just the 'delta' collected in the associated
// 'Replica' in the 'Replication_Store'.
// The target for replication are all known clients in
// 'Replication_Control_Data'.
    Replica_Id
+ Replication_Method.

Start_Single_Distribution_Trigger ::-

// A trigger which indicates that distribution has to start
// for a 'Replica' which is specified by means of the
// 'Replica_Id'. Single distribution can distribute an entire
// 'Replication_File Set' if the 'Replication_Method' is
// 'full', or just the 'delta' collected in the associated
// 'Replica' in the 'Replication_Store'. The target for
// replication is the single client which is specified.
    Replica_Id
+ Client_Id
+ Replication Method.

Require_Replica_Trigger ::-

// A trigger which indicates that a specific client requires
// replication, which is normally the case when it goes
// online. Part of the event is the client's unique
// identification, together with the latest 'Replica_Id'
// which the client received earlier.
    Client_id
+ <latest> Replica_Id.

Received_Replica_Trigger ::-

// A trigger which indicates that a specific client has
// successfully received a 'Replica' in either broadcast
// mode or by means of direct transfer of a single 'Replica'.
// Part of the event is the client's unique identification,
// together with the latest 'Replica_Id' which the client
// has just received.
    Client_id
+ <actual> Replica Id.

Client_Id ::-

// A unique identification of a client system.
// Usually given as a 'String'.
    String.

Client_Acknowledgement ::-

// Indicator whether an acknowledgement has been received
// or not.
    'none'
    | 'ack'.

Client_Replica's (store) ::-

// This is the client's local store used to keep the
// 'Replca_Id's of all the 'Replica' which the client system
// had received over time.
    {Replica}.

Replication_Acknowledgment (composite) ::-

// This is the set of acknowledgments that has been received
// regrading the distribution of a specified 'Replica.'
// '<achieved> Replication_Fulfillment' vs. '<required>
// Replication_Fulfillment' indicates whether cyclic broadcast
// replication can be stopped in case that enough client
// systems successfully received a 'Replica'.
    Replica_Id
+ Replication_Method
+ <required> Replication_Fulfillment
+ <achieved> Replication_Fulfillment
+ {Client_id + Client_Acknowledgement}.

Replication_History (store) ::-

// This is the replication distribution history.
// It is used for replication control purposes, especially
// to determine which 'Replica' a client should receive
// once it comes online.
    {Replication_Acknowledgment}.

End of Data Dictionary

The triggers mentioned in the present context are implementations of prior art technology. They can be implemented in various ways as it requires the current field of application, for instance as TCP messages, or via RPC (Remote Procedure Call) or RMI (Remote Method Invocation).

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A data replication tool according to the present invention, in particular comprising the processes 50, partly 51, and 52, 54, 55 can be realized in a centralized fashion in said server computer system, or in a distributed fashion where different elements are spread across several interconnected computer systems. In particular, the process 53 should be implemented on each client system.

Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embodied in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code or notation;
b) reproduction in a different material form.

What is claimed is:

1. A method of replicating data in a network having a central server computer system and a plurality of client computer systems connected to said central server computer system, said method comprising:
   providing functionality for the central server computer system, including functionality for:
      monitoring changes to files residing on said central server computer system;
      generating replication data, using said changes to the files, for subsequent distribution to said plurality of client computer systems;
      broadcasting said replication data from said central server computer system to said plurality of client computer systems using a Broadcast Streaming protocol;
      repeating the broadcasting of said replication data;
      setting up and evaluating statistics having at least one predetermined threshold value, said statistics including at least one of:
         (i) a number of repetitions of said broadcasting,
         (ii) a time period during which said broadcasting is to be repeated, and
         (iii) a number or fraction of said plurality of client computer systems successfully receiving the broadcasted replication data; and
      continuing the repeating the broadcast of said replication data until said statistics reach at least one of the at least one predetermined threshold value.

2. A method for replicating data in a network comprising at least one server computer system and a plurality of client computer systems connectable to said network, the method comprising:
   monitoring and storing modification information on server data of the at least one server computer system in order to generate replication data for a subsequent distribution to multiple client systems, the monitoring and storing including determining whether the generated replication data is to be a partial replication of the server data or a full replication of the server data;
   broadcasting said replication data from said server system to said multiple client systems using a broadcast protocol, wherein a single broadcasted transmission of said replication data is attempted from said server system to said multiple client systems; and
   repeating the broadcasting until a predetermined threshold of a parameter of the repeating is reached, the predetermined threshold being chosen to facilitate said multiple client systems successfully receiving said replication data.

3. The method according to claim 2 in which said broadcasting said replication data comprises streaming said replication data through the network.

4. The method according to claim 2, further comprising monitoring and storing changed files of said data server's file system, communicating with the server's file system via program facilities comprised of XDSM.

5. The method according to claim 4, wherein said monitoring said file changes comprises monitoring the success of replication on the plurality of client systems based on acknowledgements directed back to the server and issued by a client system on a successful data replication.

6. The method according to claim 2, wherein said broadcasting replication data is triggered by intervention of a system administrator, or by expiration of a predefined time, or another external event.

7. The method of claim 2, wherein the predetermined threshold is at least one of:
   (i) a maximum number of repetitions of said broadcasting;
   (ii) a maximum time period during which said broadcasting is to be repeated; and
   (iii) a number or fraction of said plurality of client computer systems successfully receiving the broadcasted replication data.

8. The method of claim 2, further comprising determining that at least one client system has not received the replication data upon termination of the repeating, and in response thereto transferring the replication data via a point-to-point data transfer protocol from said server system to said at least one client system of said plurality of client computer systems.

9. The method of claim 2, wherein when the replication data comprises a full replication of the server data, the method further comprises discontinuing repeating of broadcasting of any prior replication data with the broadcasting of the replication data comprising the full replication of the server data.

10. At least one program storage device, readable by a machine, tangibly embodying at least one program of instructions executable by the machine to perform a method for replicating data in a network comprising at least one server computer system and a plurality of client computer systems connectable to said network, said method comprising:
    monitoring and storing modification information on server data of the at least one server computer system in order to generate replication data for a subsequent distribution to multiple client computer systems, the monitoring and storing including determining whether the generated replication data is to be a partial replication of the server data or a full replication of the server data;
    broadcasting said replication data from said server system to said client computer systems using a broadcast protocol, wherein a single broadcasted transmission of said replication data is attempted from said server computer system to said client multiple computer systems; and
    repeating the broadcasting until a predetermined threshold of a parameter of the repeating is reached, the predetermined threshold being chosen to facilitate said multiple client computer systems successfully receiving said replication data.

11. The at least one program storage device of claim 10, further comprising monitoring and storing changed files of a file system of said server computer system, and communicating with said file system via program facilities comprised of XDSM;
    wherein said monitoring said changed files comprises monitoring the success of replication on the plurality of client computer systems based on acknowledgements directed back to said server computer system and issued by a client computer system on a successful data replication.

12. The at least one program storage device of claim 10, further comprising determining that at least one client system has not received the replication data upon termination of the repeating, and in response thereto transferring the replication data via a point-to-point data transfer protocol from said server system to said at least one client system of said plurality of client computer systems.

13. The at least one program storage device of claim 10, wherein the replication data comprises a full replication of the server data, the method further comprises discontinuing repeating of broadcasting of any prior replication data with the broadcasting of the replication data comprising the full replication of the server data.

14. A system for replicating data in a network comprising at least one data server computer system and a plurality of client computer systems connectable to said network, said system comprising:

means for monitoring and for storing modification information on said server data of the at least one server computer system in order to generate replication data for a subsequent distribution to multiple client computer systems, the means for monitoring and for storing comprising means for determining whether the generated replication data is to be a partial replication of the server data or a fall replication of the server data;

means for broadcasting said replication data from said data server computer system to said multiple client computer systems using a broadcast protocol, wherein a single broadcasted transmission of said replication data is attempted from said data server computer system to said multiple client computer systems; and means for repeating the broadcasting until a predetermined threshold of a parameter of the repeating is reached, the predetermined threshold being chosen to facilitate said multiple client computer systems successfully receiving said replication data.

15. The system of claim 14, wherein said means for broadcasting said replication data comprises means for streaming said replication data through the network.

16. The system of claim 14, further comprising means for monitoring and storing changed files of a file system of said data server computer system, and means for communicating with said file system via program facilities comprised of XDSM.

17. The system of claim 16, wherein said means for monitoring changed files comprises means for monitoring the success of replication on the plurality of client computer systems based on acknowledgements directed back to said data server computer system and issued by a client computer system on a successful data replication.

18. The system of claim 14, wherein said means for broadcasting said replication data comprises means for triggering said broadcasting by intervention of a system administrator, or by expiration of a predefined time, or another external event.

19. The system of claim 14, further comprising means for determining that at least one client system has not received the replication data upon termination of the repeating, and in response thereto, means for transferring the replication data via a point-to-point data transfer protocol from said server system to said at least one client system of said plurality of client computer systems.

20. The system of claim 14, wherein when the replication data comprises a full replication of the server data, the system further comprises means for discontinuing repeating of broadcasting of any prior replication data with the broadcasting of the replication data comprising the full replication of the server data.

\* \* \* \* \*

UNITED STATES PATENT AND TRADEMARK OFFICE
CERTIFICATE OF CORRECTION

PATENT NO. : 6,934,723 B2
DATED : August 23, 2005
INVENTOR(S) : Breiter et al.

It is certified that error appears in the above-identified patent and that said Letters Patent is hereby corrected as shown below:

Column 3,
Line 60, insert -- be -- after "then".

Column 12,
Line 18, delete "regrading" and insert -- regarding --.

Signed and Sealed this

Fourth Day of April, 2006

JON W. DUDAS
*Director of the United States Patent and Trademark Office*